April 18, 1939. T. E. D. BILDE 2,154,559
DISHWASHING MACHINE
Filed Oct. 22, 1934    9 Sheets-Sheet 1
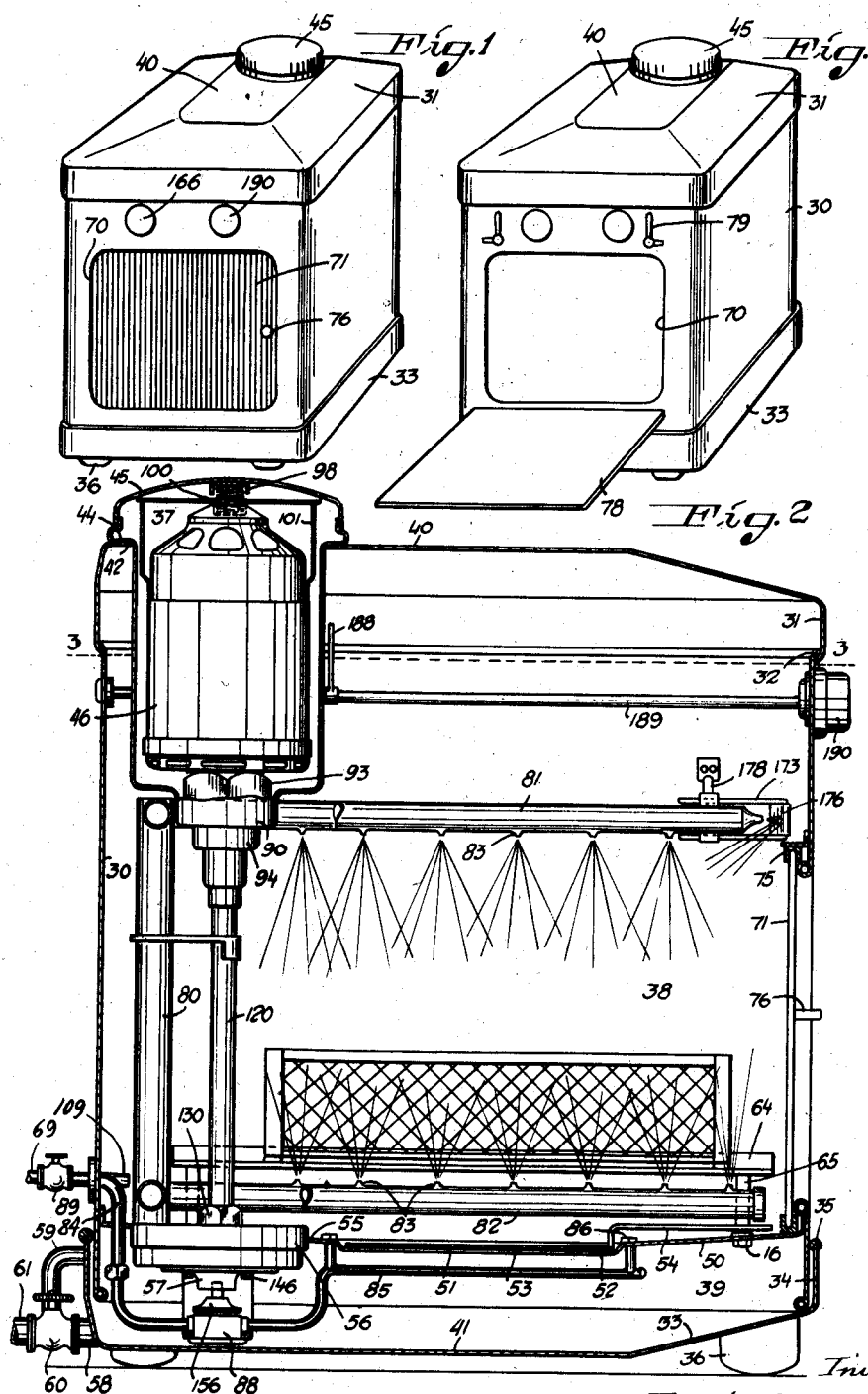

April 18, 1939. T. E. D. BILDE 2,154,559
DISHWASHING MACHINE
Filed Oct. 22, 1934 9 Sheets-Sheet 2
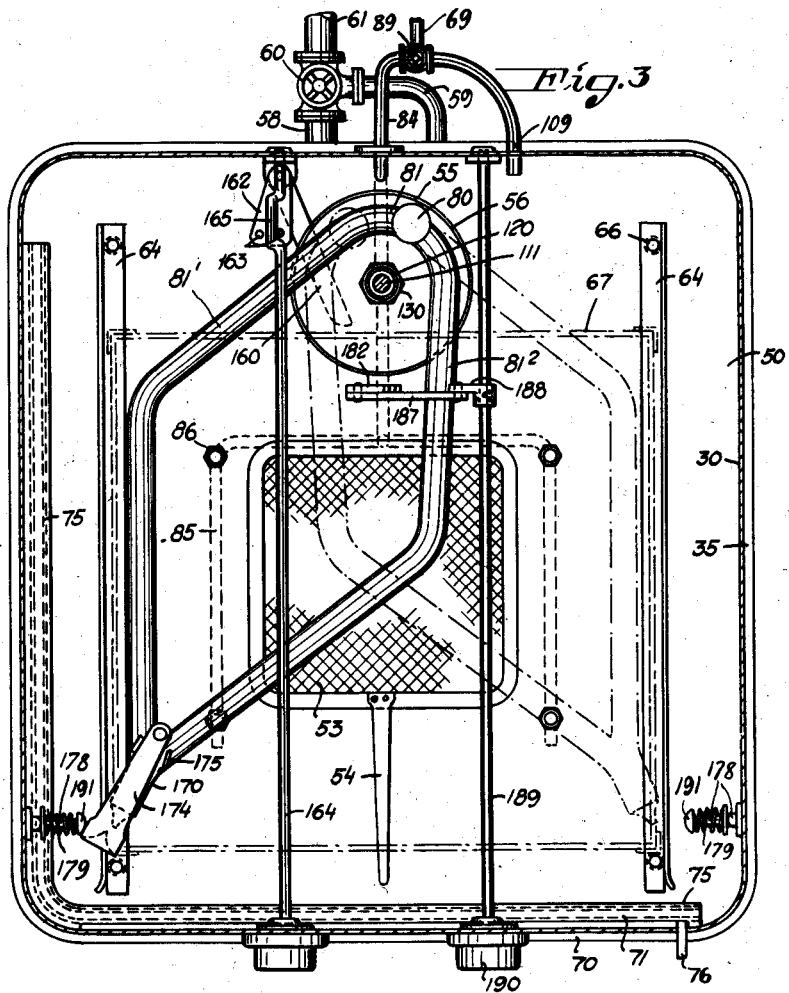
Inventor
Tord E. D. Bilde April 18, 1939.  T. E. D. BILDE  2,154,559
DISHWASHING MACHINE
Filed Oct. 22, 1934　　9 Sheets-Sheet 3

Inventor:
Tord E. D. Bilde
Cushman Darby + Cushman
Attorneys

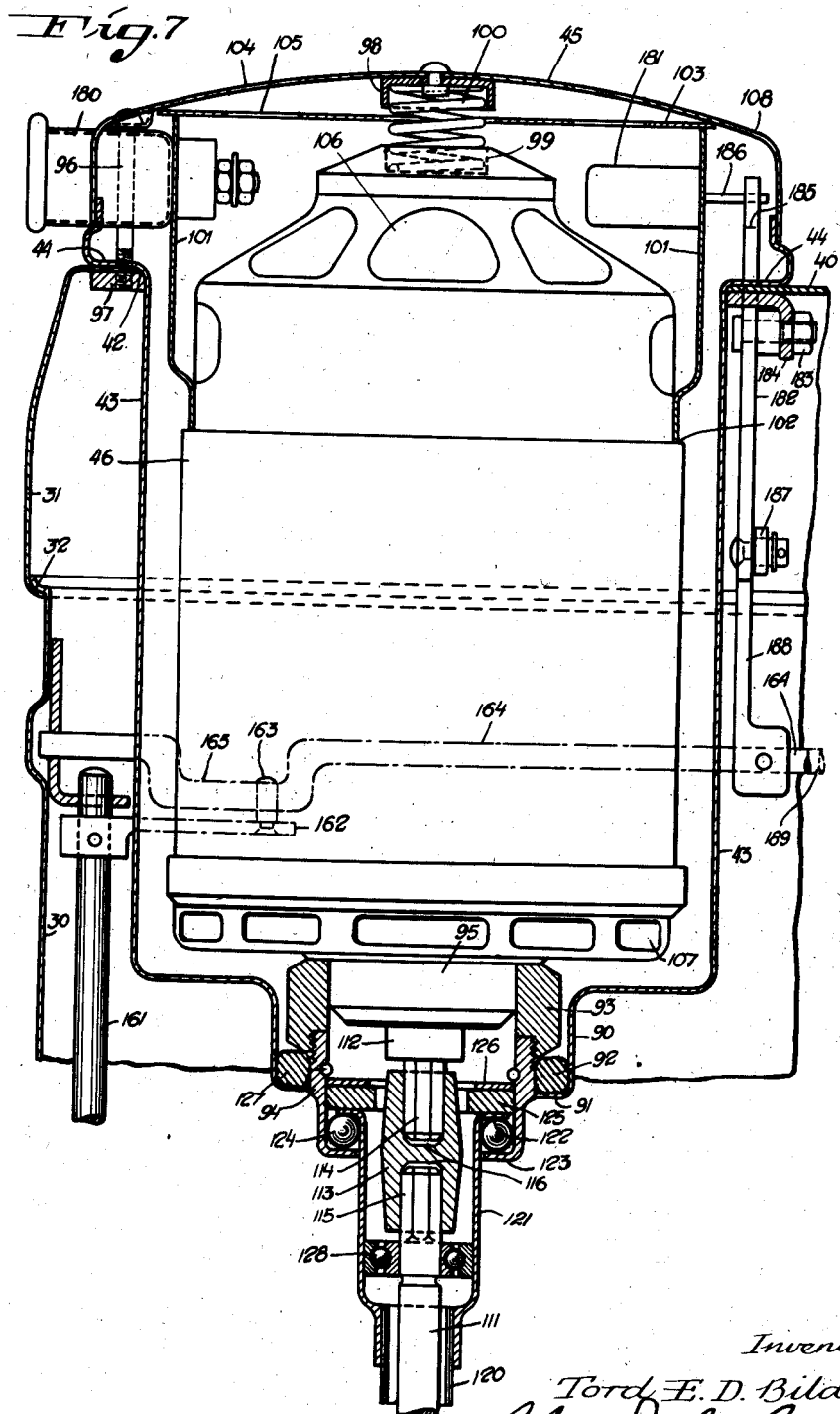

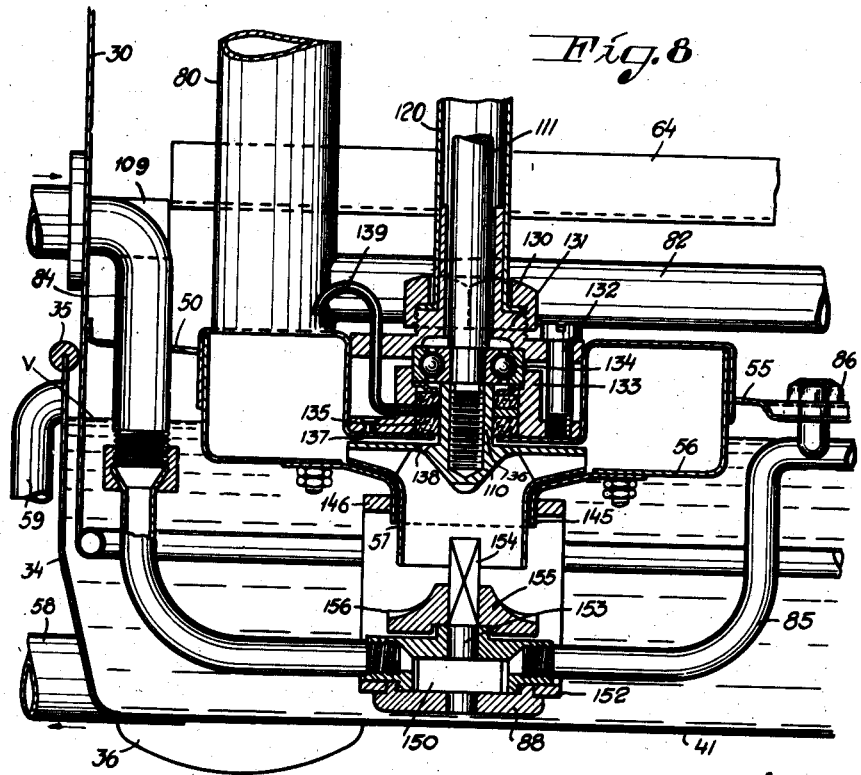
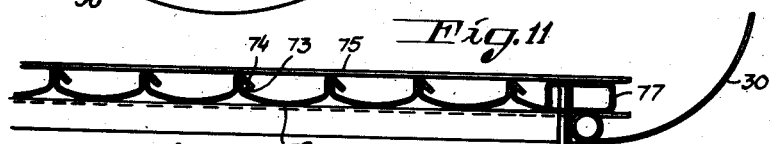
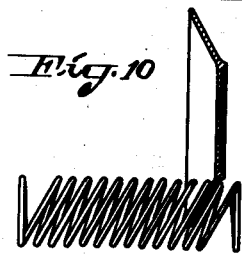
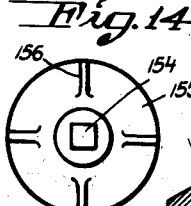

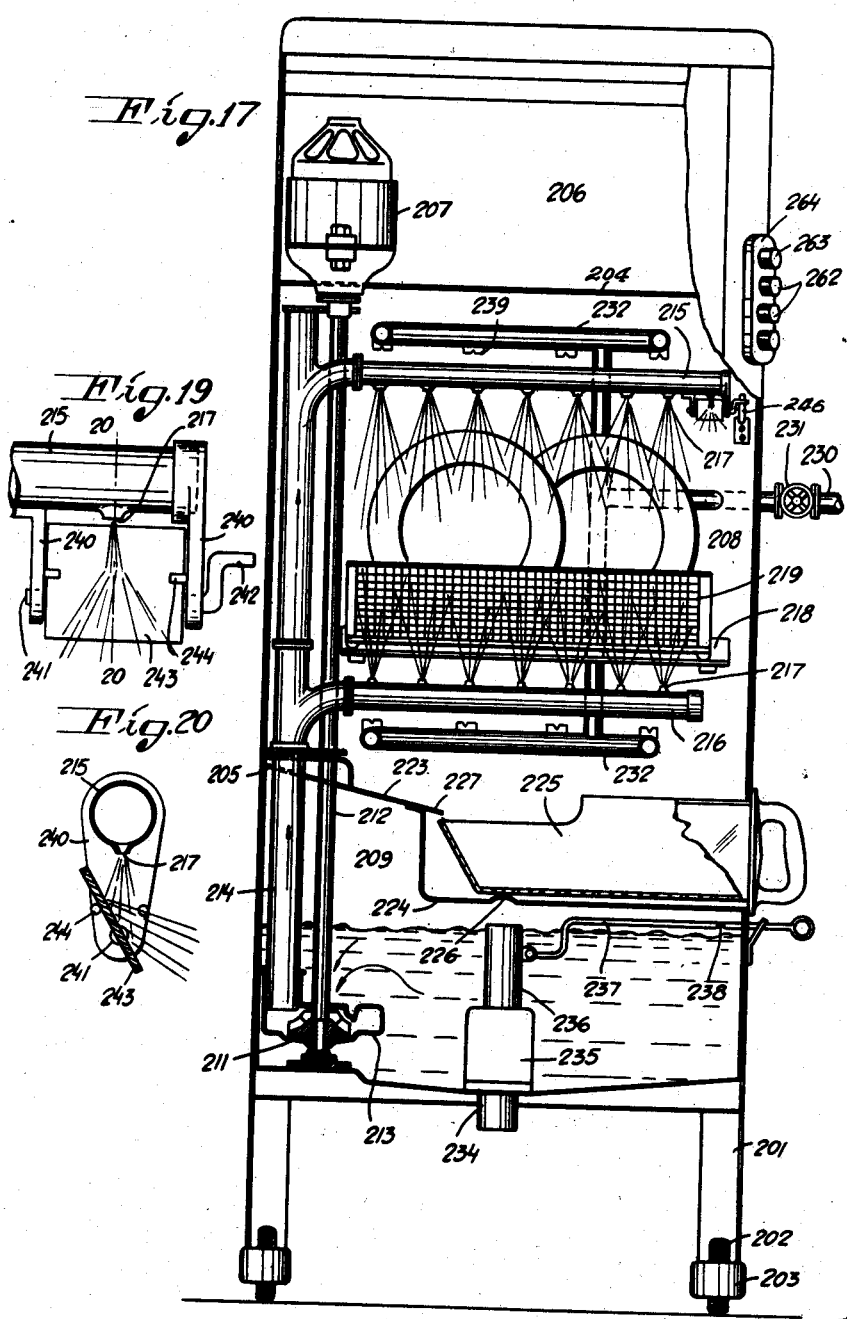

April 18, 1939.  T. E. D. BILDE  2,154,559
DISHWASHING MACHINE
Filed Oct. 22, 1934  9 Sheets-Sheet 7
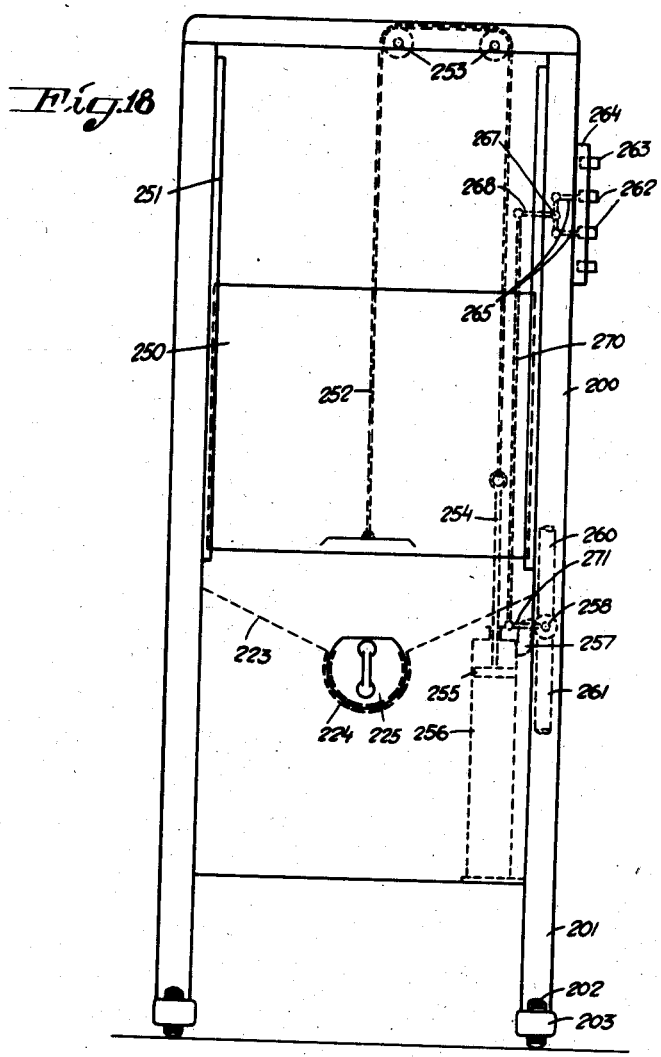
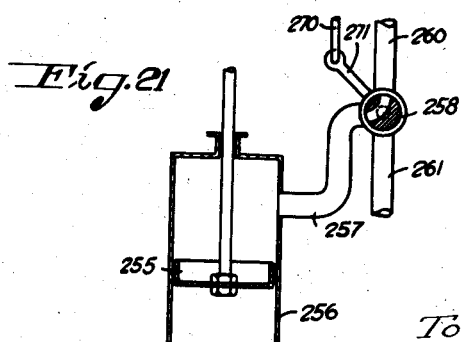
Inventor.
Tord E. D. Bilde.

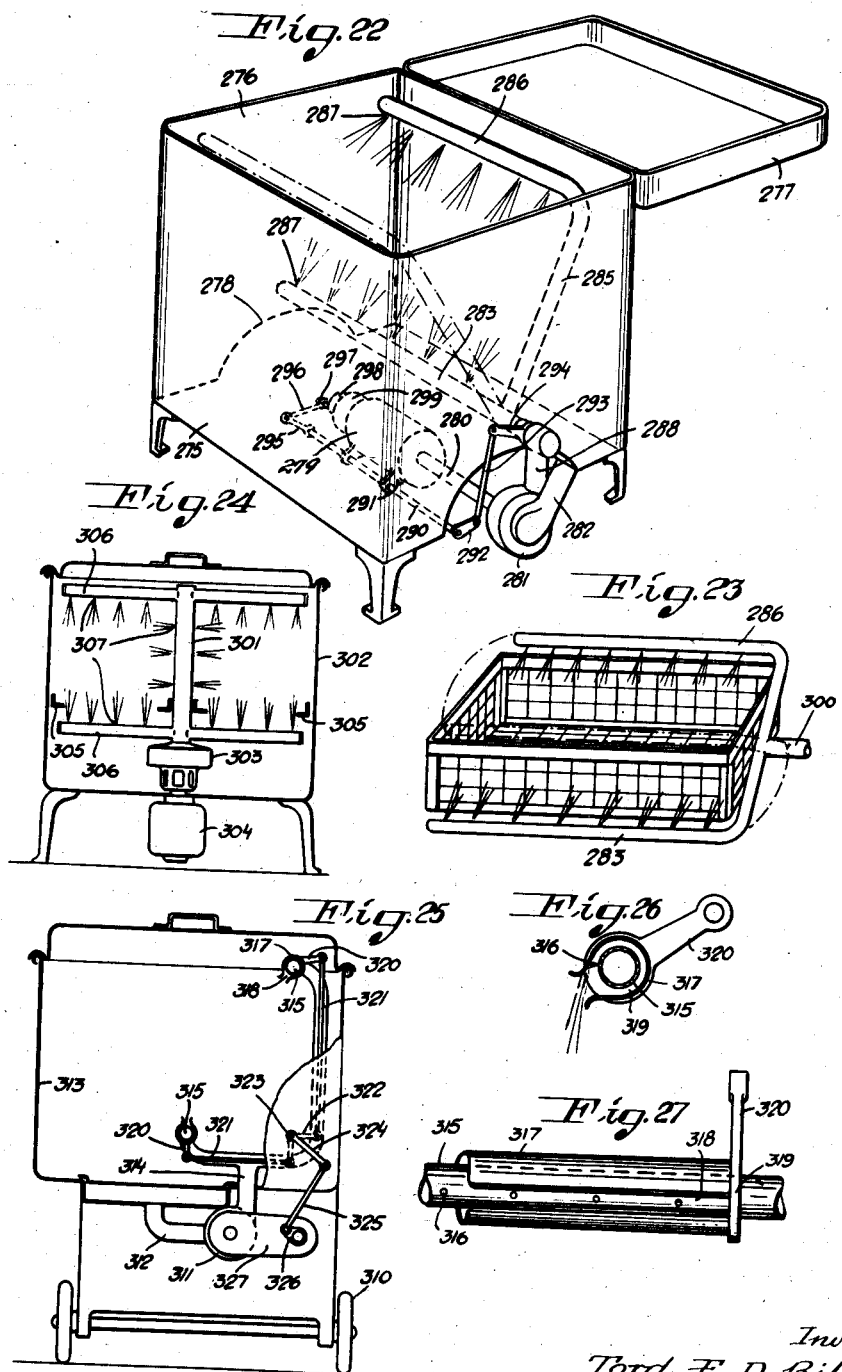

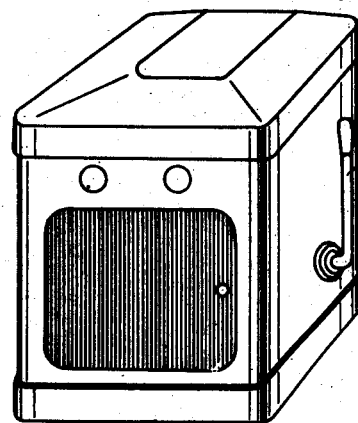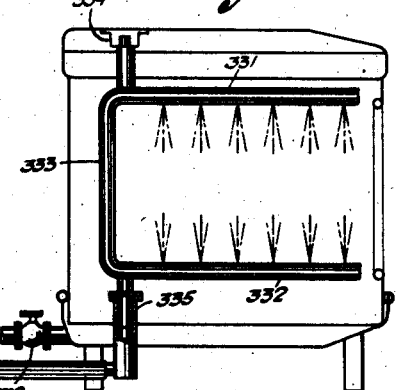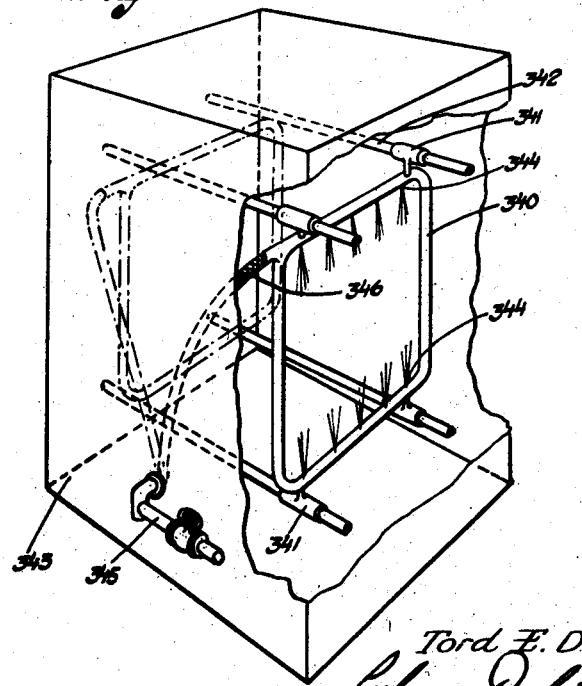

Patented Apr. 18, 1939

2,154,559

UNITED STATES PATENT OFFICE 2,154,559

DISHWASHING MACHINE

Tord Erik Daniel Bilde, Stockholm, Sweden, assignor to Bolinder's Fabriks Aktiebolag, Stockholm, Sweden, a corporation of Sweden Application October 22, 1934, Serial No. 749,456
In Sweden October 23, 1933

18 Claims. (Cl. 141—9)

My present invention relates to dish washing machines and more particularly to machines of this type having in addition to a spraying device for washing the dishes means for rinsing the dishes after the washing operation is completed.

The principal object of my invention is to provide a machine of this type in which during the washing operation the dishes are exposed to the action of jets of washing liquid performing an oscillating motion during the washing operation and spraying the dishes simultaneously from two different directions, e. g. from two opposite sides. In the following specification and claims except as otherwise limited the expression "oscillatory" is meant to comprise all movements to and fro from one position to another, independent of said movement being a swinging movement around an axis or a rectilinear reciprocating movement.

Another object of my invention is to provide a machine of the type described in which spraying of dishes in a rectangular or square basket, box or the like may be effected by oscillatory or reciprocating jets of washing liquid of the above said character with a minimum of angular movement of the spraying device or nozzles of said device or deflecting members provided within or at said nozzles in which latter case the spraying device carrying said nozzles may be stationary, wholly or in part.

A further object of my invention is to provide a machine of the type described in which said oscillating or reciprocating swinging jets of washing liquid are effected by imparting a corresponding motion to a movable spraying device, or by the provision within or outside the nozzles of rockable deflecting members so shaped and journalled as to cause the jet passing through the nozzle to be distributed broken or deflected in such a manner as to impart to the jet the desired motion. The swinging motion of the spraying device or deflector may be imparted to said device or deflector in a mechanical way, e. g. by connecting same with a driving member, for instance with an electric motor driving a pump for the circulation of the washing liquid or with the shaft of said pump, or in a hydraulic way by utilizing the reactive force of a jet of washing liquid having a direction inclined to that of the desired motion or in any suitable manner.

A still further object of my invention is to provide a machine of the type described in which a spraying device adapted to perform a motion of the character described is rigidly connected with the casing of a pump for the circulation of the washing liquid, said pump partaking in the motion of the spraying device, thereby avoiding all kinds of movable packings.

A still further object of my invention is to provide a machine of the type described having a rack for the dishes permitting dishes, e. g., plates or similar objects, to be easily placed therein without requiring any tedious fitting of the dishes into the rack while simultaneously being sufficiently resilient to avoid any risk of the dishes being damaged, when they are placed in position.

A still further object of my invention is to provide a machine of the type described having a casing shaped mainly as a parallelepiped and a spraying device arranged within said casing in such a manner as to leave greatest possible space free for the dishes to be washed in order to provide a machine having a great capacity in relation to its dimensions. To this end the spraying device which may be rigid or movable in any suitable manner, performing for instance an oscillatory motion during operation, may be mainly enclosed within the casing and comprise a spraying member on at least two sides of the space to be occupied by the dishes, e. g., one spraying member above and another below said space, the spraying members being arranged on two sides of an opening in the machine casing serving for the introduction and removal of the dishes.

My invention also comprises improvements in dish washing and rinsing machines, e. g., with regard to the utilization of the machine casing, the mounting of an electric motor for driving the circulation pump, the structure of the machine casing in view of a simple and cheap manufacture thereof, straining means for collecting the waste from the dishes, manœuvring means for the electric motor, the circulation pump, a shutter or blind for the spraying compartment, etc., connecting means between the circulation pump and another pump for a rinsing liquid and in many other respects, all said objects being apparent from the following description, reference being made to the accompanying drawings in which several embodiments of my invention are shown by way of example.

In the drawings forming part of my specification:

Fig. 1 is an external perspective view of a dish washing machine according to a first embodiment of my invention;

Fig. 2 is a vertical sectional view of the machine;

Fig. 3 is a section along the line 3—3 in Fig. 2, the electric motor being omitted;

Fig. 4 is a plan view on an enlarged scale of a jet change-over device for reversing the movement of the spraying device;

Fig. 5 is a side view of said change-over device;

Fig. 7 is a vertical sectional view on an enlarged scale of the electric motor and mounting means for same;

Fig. 8 is a vertical sectional view on an enlarged scale of the circulation pump, the rinsing pump and appurtenant parts;

Fig. 9 is a perspective view of a dish basket according to my invention;

Fig. 10 is a view of a rack for the dishes according to my invention;

Fig. 11 is a horizontal sectional view on an enlarged scale of a blind for closing the opening of the spraying compartment;

Fig. 12 is a longitudinal sectional view of part of a sprayer;

Fig. 13 is a cross sectional view on an enlarged scale of a suitable nozzle, especially for the rinsing liquid;

Fig. 14 is a plan view of a coupling member for the rinsing liquid pump;

Fig. 15 is a modification of Fig. 1;

Fig. 17 is a vertical sectional view of a dish washing and rinsing machine according to a second embodiment of my invention;

Fig. 18 is an elevation of this machine;

Figs. 19 and 20 are front view and sectional view, respectively, on an enlarged scale of a jet change-over device for reversing the movement of the spraying device as applied to this embodiment;

Fig. 21 is a vertical sectional view on an enlarged scale of means to operate a shutter for the opening in the spraying compartment as applied to this embodiment;

Fig. 22 is an external perspective view of a dish washing machine according to a third embodiment of my invention;

Fig. 23 shows a modification of Fig. 22;

Fig. 24 is a view partly in section of a dish washing machine according to a fourth embodiment of my invention;

Fig. 25 is a view similar to Fig. 24 of a fifth embodiment of the machine;

Figs. 26 and 27 show a jet deflector applied to the last-mentioned embodiment in cross section and partial elevation, respectively;

Fig. 28 is an external perspective view of a modification of Fig. 1;

Fig. 29 is a vertical sectional view of another modification of Fig. 1;

Fig. 30 is an external perspective view similar to Fig. 1 of a sixth embodiment of my invention, the machine casing being partly broken away to show the spraying device.

Figure 6:
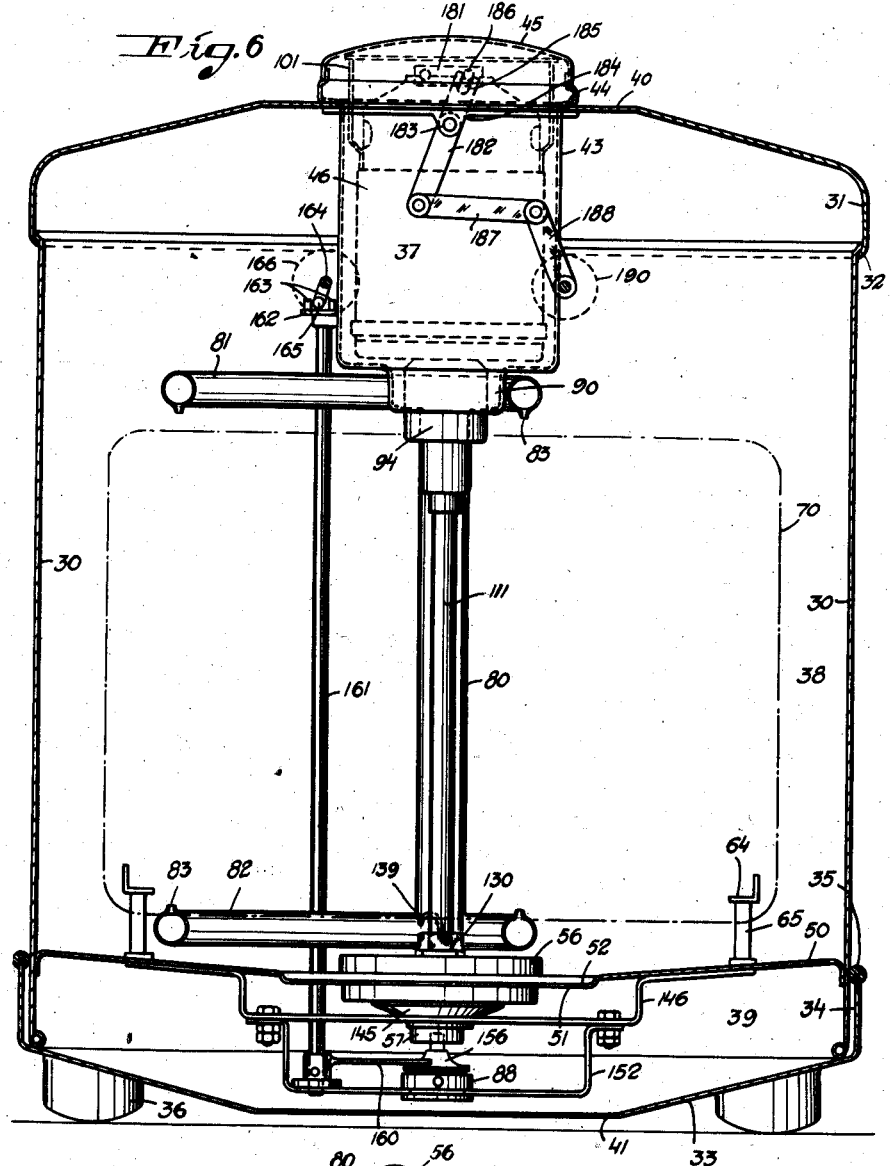
Fig. 6 is a vertical sectional view of the machine taken on a plane perpendicular to the sectional plane of Fig. 2.

According to the embodiment of my invention illustrated in Figs. 1 to 8, inclusive, the dish washing machine comprises a casing including a shell, e. g. of square cross section and preferably of sheet iron, said shell forming vertical front, rear and side walls 30, preferably formed integrally with one another. At its top the shell is closed by a cover 31 secured to the shell in any suitable manner as by soldering, welding or the like, e. g. by means of a rim 32 overlapping the upper edge of the shell. At its bottom the shell is closed by a bottom portion forming a receptacle 33 removably connected to the shell in order to facilitate cleansing of the machine. According to the drawings, the shell 30 rests loosely on the bottom of the receptacle 33 so that the lower edge portions of the shell are embraced by vertical walls 34 of said receptacle, a suitable packing 35, e. g. consisting of a rubber band, being disposed on the upper edge of the receptacle 33 and providing a tight fit against the outside of the vertical walls 30. The receptacle 33 may be provided with feet 36 to support the machine.

The cover 31 is provided with a pressed-up portion 40 and the receptacle 33 with a depressed portion 41, said portions extending from a point at a certain distance from the front wall of the shell 30 backwards substantially to the rear wall thereof, the remaining portion of the cover and the receptacle inclining from said pressed-up or depressed portion, respectively, towards the outer edges. The cover 31 with its pressed-up portion 40 and the receptacle 33 with its depressed portion 41 are of substantially the same shape so that these parts can be manufactured by one and the same pressing tool, thus facilitating mass production of the machine.

Provided in the pressed-up portion 40 of the cover 31 is an opening 42 (see especially Fig. 7) and inserted in said opening is a housing 43 resting with a shoulder 44 on portion 40 and covered by a lid 45, said housing 43 serving as a protecting casing for an electric motor 46 as will be described later on.

Provided near the bottom end of the shell 30 is a transverse partition 50 secured to the shell in any suitable manner as by soldering, welding or the like and serving to stay the shell walls 30 laterally. By the above-said housing 43 and by this partition 50 the machine casing is divided into three compartments, viz. the motor compartment 37, the spraying compartment 38 and the washing liquid compartment 39. Evidently, the partition 50 may be removably connected with the machine casing in which case the receptacle may be rigidly secured thereto but the structure shown is preferred.

The partition 50 is provided with a preferably central opening 51 and is inclined from its edges somewhat towards said opening. The opening 51 has a countersunk edge portion 52 and resting in said portion is a strainer plate 53 provided with a handle 54 to facilitate its removal for cleansing purposes. Further the partition 50 is provided with a hole 55, said hole being located right below the opening 42 in the cover 31 and serving to take up a pump 56 or the driving shaft thereof. The pump 56 has an inlet 57 protruding into the depressed portion 41 and the washing liquid contained therein.

As far as the cover 31 is concerned the provision of the pressed-up portion 40 involves the advantage of rendering possible to locate the motor 46 at a relatively great height, and with regard to the receptacle 33 the advantage of the depressed portion 41 resides in the possibility of arranging the pump and appurtenant means at a relatively low level and in causing the washing liquid to flow rapidly towards the inlet 57 of the pump 56.

At its lowest level the receptacle 33 is provided with an outlet 58 (see especially Figs. 2 and 3). An over-flow pipe 59 from said receptacle 33 communicates with said outlet 58 and is together with the outlet controlled by a three-way cock 60 adapted to connect the outlet pipe 58 or the overflow pipe 59 with a discharge pipe 61.

Extending along the opposite side walls of the shell 30 are two bars 64 (see especially Figs. 2, 3 and 6) having legs 65 secured to the partition 50 as by screws 66, said bars 64 serving to support a basket 67 or the like for taking up the dishes.

As shown in Fig. 9 illustrating a perspective view of the basket 67 on a somewhat diminished scale said basket comprises a square or rectangular frame, preferably made of metallic network, and two wire spirals 68 stretched between two opposite sides of said frame substantially on the same level, the coils being spaced apart so as to permit insertion of dishes between adjacent coils. This basket forms a suitable rack for supporting plates or similar objects, as such objects need only be moved downwardly into the basket towards the spirals to engage spaces between adjacent coils and to be reliably retained in position without any risk of tilting. Further the wire spirals are resilient so as to eliminate any risk of the objects being damaged.

I can use one or more wire spirals of the type described without combining same with a basket or the like, the spirals being in such case secured to suitable supports or to opposed walls of the machine casing. In order to attain a firmer clamping of the plates or the like between two adjacent coils I may wind the wire in such manner that the coils form an angle to the longitudinal axis of the spiral as shown in Fig. 10. By using a wire of sufficiently great diameter and by winding the wire into a spiral of transversely elongated cross section, required firmness may be given to the spiral.

Provided in the front wall of the shell 30 is an opening 70 (see especially Figs. 2 and 3), preferably of rectangular shape, for the introduction and removal of the basket 67 or the dishes or both. Preferably the height of this opening is greater than the vertical distance between the upper border thereof and the upper edge of the front shell wall and is also greater than the vertical distance between the lower border of the opening and the lower edge of the wall. During operation this opening 70 is held closed in any suitable manner as for instance by a blind 71 made from a flexible material, e. g. celluloid, thin sheet metal or the like, or composed of interengaging elements so as to be capable of being displaced to open or shut the opening 70. As clearly shown in Fig. 11 this blind 71 may consist of a plurality of relatively narrow strips 72 of sheet material, e. g. Bakelite, metal or the like having a somewhat greater longitudinal extension than the height or the width of the opening 70 depending on whether the blind is to be displaced laterally or vertically. In the embodiment shown the blind is adapted to be displaced laterally, and, consequently, the strips 72 are disposed vertically. The strips 72 may be in direct and pivotal engagement with each other, each of the strips being bent to form a groove 73 along one of its longitudinal edges and a flange 74 along the other longitudinal edge adapted to engage the groove of the adjacent strip. Strips having engaging edges of this type may be manufactured in mass production by relatively simple pressing tools. It may be observed, however, that the engaging bends of the strips may be shaped in any other suitable manner to provide a cheap, handy and tight blind.

The blind 71 is guided by bars 75 secured to the upper and lower edges of the opening 70, said bars 75 being extended along one of the adjacent vertical side walls of the shell (see Fig. 3) so as to permit the blind to be displaced laterally by means of a handle 76 serving also as stop pin limiting this movement. As shown in Fig. 11 this stop pin 76 may be secured to a separate strip 77 connected to the blind and preferably made from sheet metal, e. g. iron, said strip in the closed position of the blind projecting beyond and providing a tight fit against the edge of the opening 70. When the shell 30 is made from one integral sheet iron plate as is the case in the embodiment referred to, the corner of the shell may be rounded so as to cause the blind to follow the walls of the shell also at said corners. When, on the other hand, the shell is composed of separate walls connected with each other as by corner angles which may be preferred in some cases the guiding bars 75 may extend at some distance from the sharp corners.

Instead of using a blind for closing the opening 70 I may use a swingable shutter 78, as shown in Fig. 15, said shutter being held in closed position in any suitable manner as by handles 79 or the like.

The spraying means of my improved dish washing machine comprises according to the embodiment referred to a rising pipe 80 communicating with two tubular sprayers 81 and 82 disposed one 81 above and the other 82 below the basket 67 for taking up the dishes. The sprayers 81 and 82 are provided with nozzle-like openings 83, the nozzles of the sprayer 81 being directed downwardly and those of the sprayer 82 upwardly so as to effectually spray the dishes from two opposite sides.

According to Fig. 12 which is a longitudinal sectional view of one of the sprayers, e. g. 81, through a nozzle 83 therein, said nozzle may be formed by punching a hole in the wall of the sprayer and bending the material around the hole outwardly in a gentle curve to permit the liquid to pass onto the hole without appreciable resistance. For instance, said punching and bending operations may be effected by taking-up an opening in the tube wall opposite to the place of the intended nozzle and forming said nozzle by means of required tools introduced through said opening which is plugged-up or closed as by soldering or welding, when the nozzle is formed.

In addition to the spraying device 81, 82, 83 my improved dish washing machine may be provided with means for rinsing the dishes, when the spraying operation is completed. In the embodiment referred to said rinsing means comprises a pipe 85 disposed below the partition 50 and bent in U-form to encircle the strainer 53 in said partition 50, e. g. on three sides thereof. The rinsing pipe 85 is provided with nozzles 86 protruding through the partition and is supplied with rinsing liquid from any source of such liquid, e. g. through a supply pipe 84. In the embodiment shown a pipe 69 is adapted to be connected with an ordinary pressure water pipe line, e. g. for warm water, a three-way cock 89 being inserted in said pipe connecting same either with the pipe 84 or with an intake pipe 109 for filling the machine with warm water at the beginning of the washing operation. In case of the pressure in the pipe 69 being insufficiently high a pump 88 may be arranged in the conduit 84 as will be more fully described later on.

In Fig. 13 I have shown a preferred embodiment of a rinsing liquid nozzle 86, said nozzle consisting of a nut-shaped body to be screwed into a threaded hole in the rinsing pipe 85 and having outlet openings 87 directed against each other so as to cause the jets discharged from said openings to meet each other and to be dispersed into a fine drizzle.

Before more fully describing the spraying and rinsing means I will first describe in detail the motor 46 and the pumps 56 and 88 as well as their driving connections.

Referring more particularly to Fig. 7 the electric motor 46 is resiliently mounted in its protecting casing 43 in the following manner. At its lower end the casing 43 is provided with a collar 90 having an inwardly bent flange 91 serving as support for a packing ring 92 preferably consisting of soft resilient material. Bearing onto the upper surface of said packing ring 92 is a guiding sleeve 93 shaped as a nut and threaded onto a bearing sleeve 94 which extends through the opening formed by the flange 91. The electric motor 46 rests on the upper edge of the guiding sleeve 93, a bearing stud 95 formed on the motor casing extending into a central opening in the bearing sleeve 94 so as to ensure centering of the motor.

As already mentioned the protecting casing 43 rests with its shoulder 44 on the cover 31 or the pressed-up portion 40 thereof, the lid 45 of the casing being secured to the cover by means of screws 96 threaded into a reinforcing ring 97 on the inside of the rim of the opening 42. Secured to the inside of the lid 45 is a socket 98 and secured to said socket 98 and to the motor housing 46 in a recess 99 at the upper end thereof is a spring, e. g. a spiral spring, 100 to which the motor is suspended. The upper end of the spring coil 100 is rigidly secured to the lid in any sutable manner such as by being soldered to the inner wall of the socket 98. The lower end of the spring 100 is provided with a coil of increased diameter which engages a shoulder on the wall of the recess 99 of the motor housing 46, so that this housing is suspended by the spring 100 which in turn is secured to the lid 45. In order to direct cooling air through the motor a sleeve 101 is provided in the upper part of the casing 43, said sleeve 101 bearing on a shoulder 102 on the motor housing and having an upper transverse wall 103 bearing on the lid 45. Cooling air enters through openings 104 in the lid and openings 105 in the wall 103, flows through the usual upper and lower vent holes 106 and 107 in the motor housing, circulates around said housing and escapes through other openings 108 in the lid 45.

By means of the spring 100 and the resilient packing ring 92 the motor will be resiliently mounted within the protecting casing 43 preventing vibrations in the motor from being transmitted to the machine casing. By this means the motor will operate very silent as no resonance occurs in the machine casing which would be the case, if the motor was rigidly mounted therein.

As stated above the opening 55 in the partition 50 serves to take up the pump 56 for circulating the washing liquid, said pump being inserted in said opening 55 with some play. Referring more particularly to Fig. 8 this pump is of the self-suction and rotary type consisting of a blade wheel 110 rotatably mounted within a pump housing designated by the same numeral 56 which has been used above to denote the pump as a whole. The blade wheel 110 is formed to provide the tubular inlet pipe 57 above referred to which extends into the washing liquid contained in the reseptacle 33. The blade wheel 110 is secured at the lower end of a pump shaft 111 extending upwardly and connected to the motor shaft 112. On account of the resilient mounting of the motor in the casing 43 as above described a certain relative motion must be permitted between said shafts 111, 112. For this reason the shafts are connected with each other by a flexible coupling (see Fig. 7) consisting of a coupling sleeve 113 having two opposed end holes 116 of angular cross section. Correspondingly shaped end portions 114 and 115 of the motor shaft 112 and the pump shaft 111, respectively, engage said holes, preferably with a certain play to permit the required relative movement of the shafts to effect centering of the motor shaft 112, or the coupling sleeve 113 may consist of any suitable resilient material to allow such a movement.

The pump casing 56 is connected to a pipe 120 surrounding the pump shaft 111. The sleeve 120 carries at its upper end a bearing sleeve 121 (see Fig. 7) having an upper outwardly extending end flange 122 which together with an inwardly extending end flange 123 of the bearing sleeve 94 serve as races for a ball bearing 124. In order to prevent water sprinkles from entering said ball bearing 124 a packing ring 125 of soft material may be provided between said bearing and a washer 126 kept in position by a collar 127 on the sleeve 94. To effect centering of the shaft 111 in the pipe 120 a ball bearing 128 may be provided in the sleeve 121.

At its lower end (see Fig. 8) the protecting pipe 120 is, by means of a nut 130, rigidly connected to a socket 131 which by means of screws 132 is rigidly connected to another socket 133 secured to the pump casing 56. The sockets 132, 133 form together a carrier for a ball bearing 134 in which the pump shaft 111 is journalled. A packing 135 may be arranged between the hub 136 of the blade wheel 110 and the socket 133. Any washing liquid which may enter the small play 137 between the blade wheel 110 and the pump casing 56, especially at the pressure side of the pump, is discharged through small drain holes 138 in said wheel. To relieve the packing 135 of super-pressure and to prevent washing liquid from entering the bearing a pipe 139 is provided connecting the packing with the interior of the machine casing.

The rising pipe 80 of the spraying device is connected to the pressure side of the pump 56 to supply the sprayers 81, 82 with any suitable washing liquid which escapes through the nozzles 83 therein spraying the dishes in the basket 67, the liquid being collected in the receptacle 33 and then sucked up by the pump 56 and supplied to the sprayers and so on in circulation. To ensure an effective spraying action the sprayers 81, 82 are adapted to swing to and fro in relation to the dishes, the swinging motion being effected in any suitable manner to be described later on. In the embodiment shown the rising pipe 80 of the spraying device is rigidly connected with the pump casing 56, and, consequently, said pump casing partakes in said swinging motion, such motion being permitted by the pipe 120 carrying said pump casing being movably journalled in the ball bearing 124 as above described. By allowing the pump casing 56 to partake in the oscillating motion of the spraying device all kinds of packings are avoided. To guide the pump casing 56 in this oscillating motion a collar 145 may be secured to the underside thereof, said collar being journalled in a stirrup-shaped frame 146 secured to the partition 50 as shown in Fig. 6.

As stated above a pump 88 is inserted in the supply pipe 84 for the rinsing liquid. In the embodiment referred to (see Fig. 8) this pump is of the self-suction type having a rotating piston 150 mounted eccentrically in a pump casing designated by the same numeral 88 which is used above to denote said pump as a whole, said pump casing 88 being supported by a stirrup-shaped frame 152 secured to the frame 146 (see Fig. 6). As this pump for rinsing liquid should operate alternately with the pump 56 for the circulating washing liquid, I provide means to connect these pumps so as to automatically start the pump 88 for rinsing liquid, when the pump 56 for washing liquid is stopped. To this end the shaft 153 of the pump 88 has an extension 154 of angular, e. g. square cross section, and mounted on said extension so as to be displaceable vertically but not rotatable thereon is a coupling member 155 of such dimensions as to be capable to cover the inlet pipe 57 of the circulation pump 56. When the circulation pump 56 is operating, the coupling member 155 has a tendency of being displaced upwardly under the action of the suction in said inlet pipe 57 so as to be brought into engagement with the outer edge of said pipe either by friction alone or by projections 156 on the coupling member 155 engaging corresponding notches in the inlet pipe resulting in the rotary piston 150 of the pump 88 being coupled to the pump shaft 111, while simultaneously the supply of washing liquid to the circulation pump 56 is cut off. During this upward movement of the coupling member 155 the piston 150 will be gradually set in rotation on account of the projections 156 acting as screw blades actuated by the rotating column of liquid in the inlet 57 thus facilitating the engagement of the coupling member with said inlet.

In order to prevent actuation of the coupling member 155 during such periods when no rinsing is to take place I provide means to lock said member in its lower position, said means comprising an arm 160 (see Figs. 3 and 6) mounted in overlying relationship to said coupling member 155 and secured to a vertical spindle 161 which is rotatably mounted e. g. in the frame 152 and the rear side wall 30 of the machine casing. Secured to the upper end of said spindle 161 is an arm 162 carrying two stops 163 (see also Fig. 7). A spindle 164 journalled in the front and rear walls of the machine casing has a crank-shaped portion 165 adapted to be brought into engagement with either of said stops 163. Mounted on the end of the spindle 164 protruding through the front wall of the machine casing is a manoeuvring member, e. g. hand-wheel 166 or the like (see also Fig. 1) adapted to be adjusted from the exterior of the machine so as to move the arm 160 into and out of engagement with the coupling member 155.

When connecting the supply pipe 84 for rinsing liquid to a source supplying such liquid under pressure, e. g. an ordinary water pipe line, the pump 88 may be omitted, the coupling member 155 being replaced by a valve in the conduit 84 adapted to be actuated in the same manner as the coupling member, i. e. by the suction in the inlet pipe.

Figure 16:
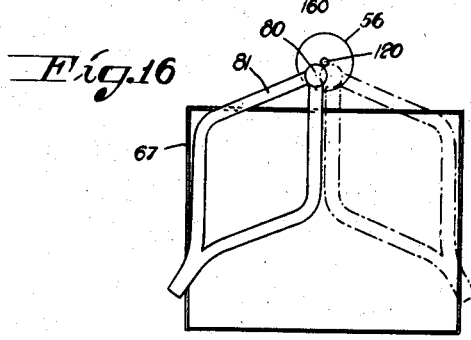
Fig. 16 is a modification of part of Fig. 3.

In the embodiment referred to the sprayers 81, 82 are shaped in a special manner to ensure most effective washing action. Referring more particularly to Figs. 3 to 5, inclusive, the upper sprayer 81 consists of two branch pipes 81¹ and 81² extending from the rising pipe 80 and situated in one and the same horizontal plane, said branch pipes first diverging and then converging enclosing a surface of more or less rhomboidal shape. The lower sprayer 82 is preferably shaped in a similar manner. By forming the sprayers in the above-said manner it will be possible to spray substantially the whole basket 67 with the dishes therein while maintaining a relatively limited cross sectional area of the machine casing. As shown in Fig. 3 only the surface between the diverging portion of the branch 81² in the one end position of the sprayer and the corresponding portion of the branch 81¹ in the other end position is not subjected to the action of the washing liquid, but by modifying the shape of the sprayers and suitably adapting said shape to the location of the swinging axis, in this case the axis of the pipe 120, this surface may be reduced to a minimum or wholly eliminated. In Fig. 16 a modification is shown in which the axis of the pipe 120 and that of the rising pipe 80 are so located in relation to each other that the jets from the sprayer 81 will spray the entire basket 67.

I will now describe the special manner of effecting oscillation of the spraying device as applied to the embodiment referred to, reference being made especially to Figs. 3 to 5, inclusive. The branch pipes 81¹ and 81² are united at their free ends, e. g. by welding, and open into a common outlet pipe 170 ending in a nozzle 171. Secured to the branch pipes at the crutch therebetween is a small tube 172 serving as bearing for a U-shaped change-over member 173 having small studs 174 engaging said tube and an inwardly curved V-shaped plate 176 secured to the web of the U. Stops 175 on the pipe 170 serve to limit the swinging motion of the member 173.

In operation the jet from the nozzle 171 will be deflected laterally by the plate 176 whereby a reactive force is created under the action of which the spraying device is moved in opposite direction to that of the deflected jet (see arrow 177 in Fig. 4). When arriving at the sides of the machine casing the change-over member 173 will be shifted by a stop secured to the machine casing, causing the jet to be deflected in opposite direction so as to reverse the direction of movement of the spraying device. Preferably said stops or buffers are adapted to ensure a soft striking of the member 173 thereagainst, e. g. consisting of a head 191 secured at the outer end of a helical spring 179 guided by a pin 178 secured to the machine casing (see especially Fig. 3.)

The electric coupling connections of the motor 46 are illustrated only diagrammatically. 180 (see Fig. 7) denotes an ordinary socket serving to connect the motor 46 with any suitable source of electric current and 181 a switch (see also Fig. 6) to close and open the electric circuit. Preferably this switch is adapted to be manipulated from the exterior of the machine, and for this reason I provide a double-armed lever 182 pivotally mounted on a pin 183 secured, for instance, to a lug 184 of the reinforcing ring 97. Provided in the upper arm of the lever 182 is a notch 185 embracing the adjusting arm 186 of the switch 181. Pivoted to the free end of the lower arm of the lever 182 is one end of a link 187 movably connected at its other end to a crank 188 secured to a spindle 189 which is journalled in the front and rear walls of the machine casing (see also Fig. 3). At its end protruding through the front wall of the casing the spindle 189 carries a manoeuvring member e. g. a handwheel 190. By rotating the spindle 189 in the one or other direction the circuit of the motor will, evidently, be closed or opened. In order to assemble the manoeuvring means of the machine at one and the same place the adjusting means for the switch 181 may be so arranged as to permit the hand-wheel 190 to be located adjacent the hand-wheel 166 controlling the rinsing pump 88. It may be observed, however, that the two hand-wheels 166 and 190 may be situated at another place or at different places, if corresponding changes are made in the motion transmitting means.

Although the operation of the embodiment of my improved dish washing and rinsing machine above described ought to be clear without further explanation I will give a short recapitulation of the manner in which the machine is operating.

In the position of rest of the machine the hand-wheel 190 occupies the position corresponding to disconnected switch 181 and the hand-wheel 166 the position corresponding to locking position of the arm 160. Further the valve 89 is closed and the valve 60 occupies the position in which the over-flow pipe 59 communicates with the discharge 61. The valve 89 is opened to connect the intake pipe 109 with the supply pipe 69 for filling the receptacle 33 with warm water, e. g. up to the level $v$ of the over-flow pipe 59 (see Fig. 8). Any suitable washing agent as for instance soap may, of course, be added to the water. The dishes to be washed are placed in the basket 67 and the blind 71 is closed. Then the hand-wheel 190 is turned in the direction to close the switch 181 and to switch-in the motor 46. Thereby the pump 56 is brought into operation causing washing liquid to be circulated from the receptacle 33 through the rising pipe 80, sprayers 81, 82, nozzles 83 and back to the receptacle 33 after having sprayed the dishes. On account of the jet of washing liquid from the nozzle 171 being deflected by the change-over device the spraying device 80, 81, 82 together with the pump casing 56 are brought to oscillate around the axis of pipe 120 in the manner set forth, i. e. around an axis parallel to and approximately coinciding with the pump shaft 111. When the spraying operation is completed, the valve 89 for rinsing liquid (usually clear water) is opened and the valve 60 is adjusted into the position in which the outlet pipe 58 communicates with the discharge pipe 61. Then the hand-wheel 166 is turned into the position to disengage the arm 160 from the coupling member 155 which by the action of the suction in the inlet pipe 57 is sucked up into engagement with said pipe causing the rinsing liquid pump 88 to be set into operation while simultaneously cutting off the supply of washing liquid to the circulation pump 56. Washing and rinsing liquids escape through the discharge pipe 61. When the dishes are sufficiently rinsed, the motor 46 is stopped by turning the hand-wheel 190 into the position to open the switch 181. The basket 67 with the dishes are removed from the machine which is then ready for a new operation after the hand-wheel 166 and the valves 60 and 89 having been restored to starting positions Referring now to the embodiment of my invention illustrated in Figs. 17 and 18 the machine casing which is mainly square in cross section comprises a framework of corner posts or bars 200, preferably of angularly bent sheet iron, to which the walls of the casing are secured, e. g. by screwing. The posts 200 may form legs 201 for the machine having feet which latter may be adjustable, e. g. consist of bolts 202 threaded into lugs 203 of the legs.

Provided within the machine casing are an upper partition 204 and a lower partition 205 dividing the casing into three compartments, viz. an upper compartment 206 for an electric motor 207, an intermediate compartment 208 serving as spraying chamber for the dishes and a lower compartment 209 forming a receptacle for the washing liquid. Consequently, also in this embodiment a sub-division of the machine casing is applied of the same kind as described with reference to the first embodiment. The upper partition 204 is preferably non-perforated to protect the motor against water sprinkles from the spraying compartment 208.

Arranged close to the bottom of the receptacle 209 is a pump 211 for the circulation of washing liquid, said pump being driven by the electric motor 207 by means of a shaft 212 extending vertically through the machine casing. Rigidly connected to a casing 213 for said pump is a vertical rising pipe 214 having two horizontally extending sprayers 215, 216 communicating therewith and arranged in the upper and lower part, respectively, of the spraying compartment 208. The sprayers 215, 216 are each provided with a plurality of nozzles 217 for spraying the dishes, which are placed in a basket 219 or the like supported by a suitable rack 218 secured to the machine frame.

The lower partition 205 comprises a non-perforated portion 223 and a perforated portion 224 forming a strainer box, e. g. of semi-circular cross-section as shown in Fig. 18, the non-perforated portion being inclined towards said strainer box so as to cause a rapid flow of the washing liquid towards same. Mounted within said strainer box 224 which may be integral with or more or less permanently secured to the non-perforated portion 223 of the partition 205 is a removable strainer box 225, a pressed-up projection 226 of the bottom of the stationary strainer holding said removable strainer box at a certain distance from said bottom. The non-perforated portion 223 of the partition 205 has an extended portion 227 adapted to guide the washing liquid into the strainer box 225. The liquid circulated by the pump 211 from the receptacle 209 through the rising pipe 214 and the sprayers 215, 216 returns to said receptacle through the strainer boxes 224, 225 passing first through the removable strainer 225 and then through the stationary strainer 224. By removing the strainer box 225 waste collected therein may be removed also during the operation of the machine, the stationary strainer 224 serving as filtering means, when the strainer 225 is removed.

The machine is also provided with means to supply rinsing liquid, usually clear water, said means comprising a supply conduit 230 having a valve 231 and communicating with rinsing pipes 232, above and below the basket 219, respectively, said pipes being provided with nozzles 233, e. g. of the type shown in Fig. 13.

The washing liquid may be removed from the receptacle 209 through a hole 234 in the bottom thereof, said hole being normally kept closed by a valve body 235 having a pipe 236 passing therethrough which serves as an over-flow for the liquid in the receptacle 209. The outlet hole 234 may be opened by tilting the valve body 235, e. g. by exerting a pull in a link 237 secured thereto and accessible from the exterior of the machine, which link may have a notch 238 or the like to lock the valve body 235 in opened position.

Also in this embodiment the sprayers 215, 216 perform an oscillating movement during operation, the means for effecting said movement differing somewhat from that described with reference to the preceding embodiment although working on the same principle. As shown especially in Figs. 19 and 20 a shaft 241 is rotatably mounted in suitable brackets 240 secured to one of the sprayers on each side of a nozzle therein, e. g. the outermost nozzle 217 of the upper sprayer 215, said shaft having a crank-shaped end portion 242. Rigidly secured to the shaft 241 between said brackets 240 is a wing 243 movable between stop pins 244 provided on the brackets from a position in which the wing 243 forms an angle of inclination with the vertical line through the nozzle 217 at the one side of said line to a position in which the wing 243 inclines in the opposite direction towards said vertical line. Evidently, the jet from the nozzle 217 will be deflected by the disk 243 so as to cause the spraying device by the reactive force created thereby to move in a direction opposite to the direction of flow of the deflected jet. Stops 246 secured to the machine casing will cause the above-said adjustment of the disk 243, when the crank 242 strikes against same, thereby causing the movement of the spraying device to be reversed.

The spraying compartment 208 may be shut or cut off by a shutter, screen, blind or the like which may be adapted to be opened and closed by being connected to a driving member adapted to be set into operation by any suitable manoeuvring means. The adjustment of such a shutter or the like may take place mechanically from any movable part of the machine, e. g. the driving motor 207 or the pump shaft 212, or hydraulically or pneumatically.

An example of such means for opening and closing a shutter 250 for the spraying compartment 208 is shown in dotted lines in Fig. 18, a detail of said means being illustrated on an enlarged scale in Fig. 21. The shutter 250 is displaceable up and down in suitable guidances 251 secured to corresponding posts 200 of the machine casing. Secured to the shutter 250 is one end of a wire 252 or the like which passes over guiding rollers 253 and at its other end is secured to a rod 254 of a piston 255 movable in a cylinder 256.

A conduit 257 connects the cylinder space above the piston 255 with a valve, e. g. a three-way cock 258, adapted to connect said conduit 257 either with a supply pipe 260 for pressure liquid, e. g. an ordinary water pipe line, or with a discharge pipe 261. When it is desired to open the shutter 250 the cylinder space above the piston 255 is connected with the pressure conduit 260 causing said piston to be pressed downwardly thereby lifting the shutter 250 into open position. To close the shutter the valve 258 is adjusted to bring said cylinder space into communication with the discharge pipe 261, the shutter sliding downwardly due to its own weight restoring the piston 255 into starting position and simultaneously driving out the pressure liquid from the cylinder thereby damping the movement of the shutter.

The setting of the valve 258 may take place by a handle or the like, e. g. two push buttons 262 arranged together with other manoeuvring means, for instance a switch 263 for the electric motor, etc., on one of the corner posts 200 of the machine casing, preferably assembled on a common board 264. The buttons 262 actuate each an arm 265 of a three-armed lever mounted on a pin 267 on the machine casing and having its third arm 268 pivoted to the upper end of a push rod 270 which in turn is connected to an arm 271 rigidly secured to the spindle of the valve 258. By pushing one of the buttons 262 inwards the valve 258 will be shifted so as to bring the cylinder space above the piston 255 into communication with either the pressure conduit 260 or the discharge pipe 261.

In the two embodiments of my invention above described the oscillatory motion of the spraying device is effected in hydraulic way by utilizing the reactive force created by a jet of liquid having a direction oblique to plane of oscillation of the spraying device. As already stated, this movement of the spraying device may, however, also be effected in a mechanical way, an embodiment of a dish washing machine according to my invention working on this principle being shown in Fig. 22. In this figure all parts of the machine except the spraying device and the driving means therefor are omitted for the sake of simplicity.

According to this embodiment the machine casing comprises a box-shaped container of rectangular form having a bottom 275, side walls 276 and a cover 277 hinged to one of said side walls. The bottom 275 has a pressed-up portion 278 in which an electric motor 279 is located, connected by means of a shaft 280 to a rotary pump 281 which by means of an inlet 282 communicates with the interior of the casing. The spraying device comprises a lower horizontal spray pipe 283 communicating by means of an upwardly extending pipe 285 with an upper horizontal spray pipe 286, the pipes 283 and 286 being each provided with a plurality of suitable spray nozzles 287. At its end adjacent the pump 281 the lower pipe 283 is journalled in and communicates with the outlet pipe 288 of the pump.

The means for transmitting motion to the spraying device comprises a shaft 290 journalled in lugs 291 of the motor 279 and having at its end adjacent the pump an arm 292 secured thereto, said arm being by means of a link 293 pivotally connected to a crank 294 secured to the lower spray pipe 283. Secured to the other end of the shaft 290 is a crank 295 pivotally connected by means of a link 296 to a pin 297 secured eccentrically to a disk 298 fixed to the slowest rotating shaft of a gearing for reducing the speed of the motor 279, said gearing being shown in the figure only by its casing 299.

The operation of the machine will be clear without further explanation. The dishes placed in a suitable rack, for instance a basket (not shown), between the upper and lower spray pipes 283 and 286 are sprayed by oscillating jets from two opposite sides, the upper sprayer 286 performing a movement from the position shown by full lines to that shown by dotted lines, whereas the lower sprayer is rotated to and fro around its own longitudinal axis. Consequently, the swinging axis of the spraying device coincides with the longitudinal axis of the lower sprayer 283.

A modification of the embodiment shown in Fig. 22 is illustrated in Fig. 23 according to which both sprayers 283 and 286 are brought to oscillate around a swinging axis located between them, e. g. the axis of a common inlet pipe 300 which may be journalled in and communicate with the outlet pipe of the pump in the same manner as described with reference to the preceding embodiment.

According to the embodiment shown in Fig. 24 the spraying device comprises a vertical rising pipe 301, located centrally of the machine casing 302 which may be circular in cross section, said rising pipe 301 having its lower portion formed to provide a casing 303 for a rotary pump driven by an electric motor 304 placed outside the casing below the bottom thereof. Branched off from the rising pipe 301 above and below a support or supports 305 for a dish carrier, respectively, are hollow spray arms 306. Jets from nozzles 307 in said spray arms and, if desired, also in the rising pipe 301 spray the dishes from three different directions. The spraying device comprising the spray arms 306 and the rising pipe 301 may be oscillated in any of the manners above described, e. g. hydraulically or mechanically. The oscillatory movement of the spraying device may be such as to cause reverse of the movement first when the device has been rotated through more than 360°.

In Fig. 25 an embodiment of my invention is shown in which the spraying device is stationary, the required oscillation of the jets being effected by rockable deflecting members operated from a movable part of the machine. According to this embodiment the machine is supported on wheels 310 to facilitate its transport. A pump 311 has an inlet pipe 312 communicating with the interior of the machine casing 313 at a suitable low level and an outlet pipe 314 communicating with upper and lower spray pipes 315 having nozzles or openings 316 (see Figs. 26 and 27). Surrounding each of the spray pipes is a tubular screen 317 having a longitudinal slit 318 in front of the openings in the spray pipe and end walls 319 in which said pipe is mounted so as to permit rotation of the screen 317. Secured to each of said screens 317 at the end thereof adjacent the pump 311 is an arm 320, e. g. made integral with the corresponding end wall 319, said arm being at its free end pivotally connected by means of a link 321 to one arm of a bell crank lever 322 fixed to a pin 323 journalled in the machine casing. Secured to the same pin 323 is a link 324 movably connected by means of rod 325 to a crank arm 326 fixed to the slowest rotating shaft of a gearing 327 for reducing the speed of the pump 311. It is clear without further description that in operation the jets from the nozzles 316 will perform an oscillatory motion on account of their deflection by the screens 317 which are rocked to and fro between two end positions by the motion transmitting means described above.

The object of Fig. 28 is to show that the circulation pump instead of being driven by an electric motor or the like may be driven manually, said pump which may be of any suitable hand operated type being operated by means of the handle 330.

In Fig. 29 a machine according to my invention is shown in which also the pump is omitted, the spraying of the dishes being effected by clean water supplied from an ordinary pressure water pipe line. The spraying device comprises upper and lower sprayers 331 and 332, respectively, connected with each other by a rising pipe 333, said spraying device being movably mounted in an upper bearing 334 and a lower bearing 335 formed as an inlet and connected by a conduit, e. g. a flexible tube 336, with a source of pressure liquid, e. g. a pressure water cock 337. The casing is provided with a valve controlled outlet 338 for the water. The oscillating movement of the spraying device may be effected in the manner described by utilizing the reactive force of a water jet.

At last a view of an embodiment of my invention is shown in Fig. 30 in which the spraying device performs a rectilinear oscillatory or reciprocating motion. According to this figure the spraying device consists of a tubular frame 340 of substantially rectangular shape journalled by means of upper and lower bearing sleeves 341 in pairs of upper and lower rods 342 extending between and secured to front and rear walls of the machine casing 343. The tubular frame 340 is provided with nozzles or openings 344 distributed along its upper and lower horizontal sides, or in substitution therefor or complementary thereto with nozzles and openings distributed along its vertical sides. The machine may be adapted for circulation of a washing liquid for which purpose it may be provided with a suitable pump driven manually or by a motor substantially as described with reference to the preceding embodiments, and the oscillatory or reciprocating movement may be imparted to the spraying device either in mechanical way or hydraulically as likewise set forth in the above description. According to the figure washing liquid is supplied to the spraying device 340 from a supply pipe 345, e. g. an ordinary water pipe line, through a hose 346 so as to permit displacement of the spraying device from the position shown in full lines to that shown in dotted lines. Evidently I may use any other movable connection between the spraying device and the supply pipe.

It is to be observed that the embodiments above described and shown in the accompanying drawings are only illustrative and may be modified in several respects, especially with regard to appliances, without departing from the principle of my invention.

What I claim is:—

1. In a dish washing machine having a casing and a rack for supporting the dishes, two interconnected spray nozzle pipes each on one of two opposite sides of the rack, means to supply a washing liquid to said pipes, means automatically to impart to the pipes an oscillatory motion, said means comprising a movable deflecting member mounted on one of said spray pipes in front of a nozzle therein for directing the jet from said nozzle obliquely to the direction of oscillation of the pipes so as to cause the pipes to be moved by the reactive force of said jet, and means on the casing adapted to change the inclination of said deflecting member so as to reverse the direction of oscillation of the pipes.

2. In a dish washing machine having a casing and a rack for supporting the dishes, a spray nozzle pipe for spraying the dishes in the rack, a pump to supply a washing liquid thereto, a housing for said pump rigidly connected to said spray nozzle pipe, and means to impart an oscillatory motion to said pump housing and pipe.

3. In a dish washing machine having a casing and a rack for supporting the dishes, a spray nozzle pipe for spraying the dishes in the rack, a rising pipe rigidly connected with said spray nozzle pipe and communicating therewith, a pump comprising a rotary member to supply a washing liquid to said rising pipe, a housing for said pump rigidly connected to said rising pipe, means to impart an oscillatory motion to said housing and pipe, a motor, and a shaft coinciding with the axis of oscillation of the housing and pipe to transmit power from the motor to the rotary member of the pump.

4. In a dish washing machine having a casing and a rack for supporting the dishes, a spray nozzle pipe for spraying the dishes in the rack, a rising pipe arranged centrally within the casing and rigidly connected to the spray nozzle pipe to communicate therewith, a pump to supply a washing liquid to said rising pipe, a housing for said pump formed by the lower portion of said central rising pipe, and means to impart to said housing and pipe an oscillatory motion.

5. In a dish washing machine having a casing, means to circulate a liquid within said casing for washing dishes therein, said means comprising a spraying device, a pump arranged at the bottom of said casing for feeding washing liquid to said spraying device, a shaft for said pump extending upwardly therefrom, a motor arranged at the top of the casing, a shaft for said motor extending downwardly in vertical alignment with the pump shaft, a housing for the motor, means resiliently to support the motor by said housing and a flexible coupling between said shafts.

6. In a dish washing machine having a casing comprising a top wall, means to circulate a liquid within said casing for washing dishes therein, said means comprising a spraying device, a pump for feeding washing liquid to said spraying device and a motor for driving said pump, an opening in said top wall, said machine casing comprising a housing for the motor protruding through said opening and adapted to prevent liquid sprinkles from coming into contact with the motor, and means resiliently to mount the motor in said housing.

7. In a dish washing machine having a casing and a cover therefor, means to circulate a liquid within said casing for washing dishes therein, said means comprising a spraying device, a pump for feeding washing liquid to said spraying device and a motor for driving said pump, an opening in said cover, said casing comprising a liquid-tight housing for the motor protruding through said opening, a resilient member at the lower end of said housing and resilient means to support the motor by said housing.

8. In a dish washing machine having a casing, means to circulate a liquid within said casing for washing dishes therein, said means comprising a spraying device, a pump having a housing and a rotary member therein for feeding washing liquid to said spraying device, and a motor for driving said rotary member, said spraying device being rigidly connected to said pump housing, and means to oscillate said pump housing and spraying device.

9. In a dish washing machine having a casing, means to circulate a liquid within said casing for washing dishes therein, said means comprising a spraying device, a pump having a housing and a rotary member therein for feeding washing liquid to said spraying device and a motor for driving said rotary member, said spraying device being rigidly connected to said pump housing, means rotatably to suspend said pump housing from said motor and means to oscillate said pump housing and spraying device.

10. In a dish washing machine having a casing, means to circulate a liquid within said casing for washing dishes therein, said means comprising a spraying device, a pump having a pump housing rigidly connected with said spraying device and a rotary member in said housing for feeding washing liquid to the spraying device, and a motor, a shaft connecting the motor with said rotary member, a sprinkle-tight housing for said motor, a pipe surrounding said shaft and rotatably mounted in the motor housing, said pipe being connected to the pump housing, and means to impart an oscillatory motion to said pump housing and said spraying device.

11. In a dish washing and rinsing machine having a casing, means to circulate a liquid within said casing for washing dishes therein, said means comprising a spraying device, a pump for feeding washing liquid to said spraying device and a motor for driving the pump, said pump comprising a pump housing, a member rotatable in said housing and having an inlet rigidly connected thereto, means to supply liquid for rinsing the dishes, means operable by suction in said inlet to control said rinsing liquid supplying means, and means operable from the exterior of the machine to actuate said controlling means to put said rinsing liquid supplying means into and out of operation.

12. In a dish washing and rinsing machine having a casing, means to circulate a liquid within said casing for washing dishes therein, said means comprising a spraying device, a pump for feeding washing liquid to said spraying device and a motor for driving the pump, said pump having a pump housing, a member rotatable in said housing and an inlet rigidly connected with said rotatable member, a rotary pump to supply liquid for rinsing the dishes, a coupling member connected to said rinsing liquid pump and adapted under the action of suction in the inlet of the washing liquid pump to be coupled to said inlet so as to rotate therewith, and means operable from the exterior of the machine normally to hold said coupling member out of engagement with said inlet.

13. In a dish washing machine, a casing comprising a top portion, a bottom portion and an intermediate portion, said top and bottom portions having each a pressed-up part, said pressed-up parts being of such similar shape as to permit their manufacture by one and the same pressing tool, means to circulate a liquid within said casing for washing dishes therein, said means comprising a spraying device and a pump for feeding washing liquid to said spraying device, means in the pressed-up part of the casing top portion for resiliently mounting the motor, and an inlet for said pump protruding into the pressed-up part of the casing bottom portion.

14. In a dish washing machine, a casing comprising a shell having a wall at its bottom including a strainer, a removable receptacle embracing the shell at the bottom thereof and a cover closing the top end of the shell, means to circulate a liquid within the casing for washing dishes therein, said means comprising a spraying device above said wall and a pump for feeding washing liquid from said receptacle to said spraying device.

15. A dish washing machine having a casing mainly shaped as a parallelepiped and having an opening of mainly rectangular shape for introducing and removing the dishes, a spraying device within said casing and comprising spaced spray nozzle pipes swingable to and fro on each of two opposite sides of the space to be occupied by the dishes, said pipes having their swinging centre arranged opposite said opening.

16. In a dish washing machine having a casing and a rack for supporting the dishes, a spraying nozzle pipe for spraying the dishes in the rack, a pump to supply a washing liquid thereto, a housing for said pump rigidly connected to said spray nozzle pipe, and means for imparting motion to said pump housing and pipe.

17. In a dish washing machine having a casing and means for supporting the dishes, a spray pipe above said supporting means, another spray pipe below said supporting means, a pump to supply a washing liquid to said pipes, said spray pipes being movable about a vertical axis, automatic means to impart an oscillatory motion to said spray pipes, said automatic means including a nozzle having a movable change-over deflecting member, said nozzle communicating with the pump and operatively connected to the spray pipes, and fixed means operatively associated with said deflecting member for moving the same so as alternately to deflect the liquid passing through the nozzle laterally in such directions as to impart an oscillatory movement to said nozzle and the spray pipes.

18. In a dish washing machine having a casing and means for supporting the dishes, a spray pipe above said supporting means, another spray pipe below said supporting means, a pump in the lower portion of the casing, a rising pipe connected with said pump and with said spray pipes, automatic means to impart an oscillatory motion to said spray pipes and said rising pipe, said automatic means including a nozzle having a movable change-over deflecting member, said nozzle communicating with the pump and operatively connected to the rising pipe and the spray pipes, and fixed means operatively associated with said deflecting member for moving the same so as alternately to deflect the liquid passing through the nozzle laterally in such directions as to impart an oscillatory movement to the nozzle, the rising pipe and the spray pipes.

TORD ERIK DANIEL BILDE.